(12) United States Patent
Ellington, Jr. et al.

(10) Patent No.: US 6,639,917 B1
(45) Date of Patent: Oct. 28, 2003

(54) CONVERGED SERVICE FOR INTERCONNECTED LOCAL AREA NETWORKS

(75) Inventors: William Woollcott Ellington, Jr., Raleigh, NC (US); Robert Daniel Love, Raleigh, NC (US); Kathleen Miriam Wilhelm, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,616

(22) Filed: Aug. 4, 1999

Related U.S. Application Data

(60) Provisional application No. 60/095,337, filed on Aug. 4, 1998.

(51) Int. Cl.[7] .............................................. H04L 12/56
(52) U.S. Cl. ...................................... 370/401; 370/466
(58) Field of Search .................................. 370/466, 465, 370/474, 401, 403, 404, 405, 467

(56) References Cited

U.S. PATENT DOCUMENTS

| 5,608,726 | A | * | 3/1997 | Virgile ........................ 370/401 |
| 5,720,032 | A | * | 2/1998 | Picazo et al. ................ 370/401 |
| 5,910,954 | A | * | 6/1999 | Bronstein et al. ........... 370/401 |
| 5,999,541 | A | * | 12/1999 | Hinchey et al. ............. 370/466 |
| 6,154,462 | A | * | 11/2000 | Coden ......................... 370/403 |
| 6,426,954 | B1 | * | 7/2002 | Krause .................. 370/395.53 |

* cited by examiner

Primary Examiner—Chau Nguyen
Assistant Examiner—Keith M. George
(74) Attorney, Agent, or Firm—Carlos Munoz-Bustamanta; Sawyer Law Group, LLP

(57) ABSTRACT

A converged service frame format is defined to support any-to-any connections between Ethernet and Token Ring LANs. The converged service frame format is a superset of standard Ethernet frame formats defined in IEEE 802.3 specifications. Where the frame source is an Ethernet LAN, an 802.1Q tag is added. Where the frame source is a Token Ring LAN, other operations are performed, including mapping of Token Ring priority bits into an appropriate field in the converged service frame. The operations required to map either an Ethernet or a Token Ring frame into the converged service frame are performed at an edge device at a point of ingress into an intervening network. The inverse operations required to restore the Ethernet or Token Ring frame are similarly performed in an edge device at a point of egress from the network.

4 Claims, 5 Drawing Sheets

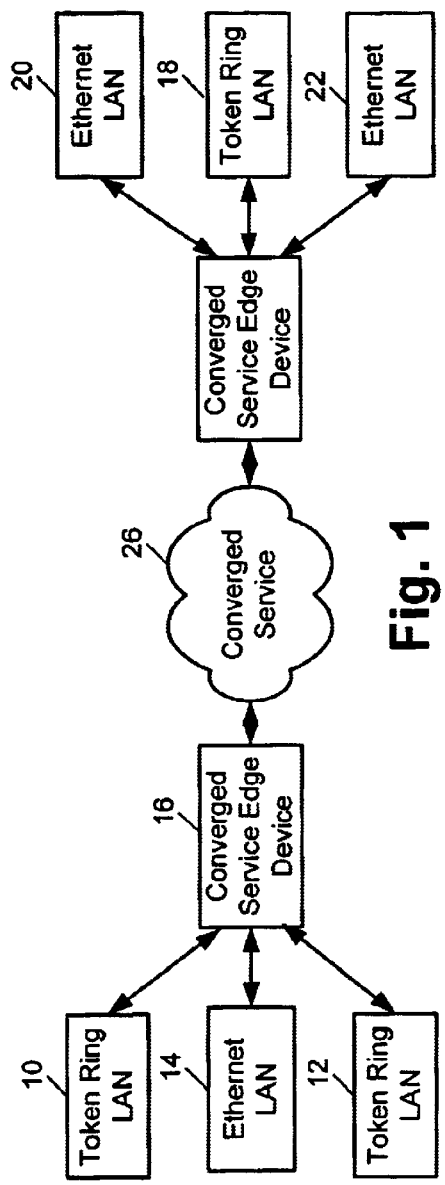

CONVERGED SERVICE FOR INTERCONNECTED LOCAL AREA NETWORKS

RELATED APPLICATION

This application claims the benefit of U.S. Provisional Application No. 60/095,337, filed Aug. 4, 1998.

FIELD OF THE INVENTION

The present invention relates to data communications networks and more particularly to a converged service for transporting frames between interconnected local area networks employing the same or different frame protocols.

BACKGROUND OF THE INVENTION

Initially, computer systems conformed to what could be described as a host-centric model. Individual users interacted with a single, central host computer or mainframe through workstations attached to the mainframe either directly or indirectly through devices commonly referred to as cluster or display controllers. Virtually all of the data processing power resided in the mainframe with the individual workstations having relatively little data processing power or "intelligence". The mainframe controlled all communications among workstations or between workstations and system resources, such as disk drives and printers. Assuming that the exchanges of data between workstations or between workstations and system resources could be characterized as "communications", the communications were localized in nature.

Data communications networks evolved as a consequence of a need for users attached to different mainframes to communicate with each other. Early data communications networks consisted of a number of isolated host-centric systems which were connected through public or private switched telephone networks. Communication controller devices provided the interfaces between the mainframes and the switched telephone networks. In such data communications networks, the mainframe in each of the connected host-centric systems played a central role in management of the connections between workstation users in the different systems.

Over time and as a result of improvements in computer technology, the processing power originally confined to mainframes began to appear in smaller and smaller computers including devices now commonly referred to as personal computers. Over a relatively short period of time, personal computers were developed that possessed the processing power formerly found only in mainframes.

To take advantage of the distribution of processing power to personal computers and of improvements in data communication technology, new types of networks, generically referred to as local area networks or LANs, were developed. At the most basic level, a local area network or LAN consists of a plurality of workstations or other devices (such as printers or disk drives) which are all connected to a shared communications medium. Any device attached to a shared communications medium may be generically identified as a "station". Data to be exchanged between stations in the same local area network is written onto the communications medium by the source station and then copied from the medium by the destination station. Even where the area network is connected to a mainframe, the mainframe plays no significant role in the transfer of data between devices in the same local area network.

While several different kinds of local area networks have been proposed, the two most common kinds in current use are Ethernet and Token Ring local area networks. There are significant differences between these two kinds of local area networks.

An Ethernet local area network may also be referred to as a Carrier Sense Multiple Access/Collision Detect or CSMA/CD network. In an Ethernet local area network, all stations have an equal opportunity to transmit information across the shared bus. If a station has information to transmit, it first listens to the shared bus to determine whether any other station is already using the bus. If the bus is found to be idle, the listening station begins to transmit data. If the bus is found to be busy, the listening station waits for a predetermined period of time before trying to access the bus again. Information transmitted onto the bus is received by every station attached to the bus; that is, the information is broadcast. A station for which the information is intended recognizes its own address in the information and accepts the transmitted information. All other stations discard or ignore the information.

Token Ring local area networks use a logical ring to which all stations are connected. Any station who wishes to transfer information onto the ring must first acquire a "token", which is a special data structure or frame. Once the station has the token, it may transfer information onto the ring. The information flows in one direction around the ring and through each of the connected stations. If a station is not intended to receive the information, it simply passes the information on to the next station on the ring. If a station is intended to receive the information, it copies the information into station memory for its use but still passes the information on to the next station on the ring. The information remains on the ring until it traverses the entire ring and reaches the source station. The source station strips the information from the ring and writes a "free" token back on to the ring The token circulates around the ring until it is acquired by another station having information to transmit.

Both Ethernet and Token Ring technologies have their virtues. Ethernet installations tend to be less expensive than Token Ring installations. On the other hand, Token Ring networks can handle larger frame sizes than Ethernet networks, can accommodate a frame handling technique known as source routing and can accommodate different priority levels of data. These capabilities allow load balancing, automatic route recovery without session loss and use of redundant addresses in Token Ring local area networks.

Both Ethernet and Token Ring local area technologies are defined by specifications issued by the Institute of Electrical and Electronic Engineers (IEEE). Ethernet local area network technology is defined in IEEE 802.3 specifications while Token Ring local area network technology is defined IEEE 802.5 specifications. The IEEE specifications define many aspects of each of these local area network technologies, including the structure of the data frames which are used to transport information within the local area network. For reasons which are not important to an understanding of the present invention, the frame structures used in Ethernet local area networks are different than the frame structures used in Token Ring local area networks.

If individual local area networks were always to remain isolated one from another, the differences in frame structures would pose no problem. However, because users' needs to communicate are not limited to the particular local area network to which they are attached, it is desirable to interconnect different local area networks to permit users on those different networks to communicate as if they were on the same network. One problem in interconnecting local area networks is that such networks may not be directly connected with another but may be separated by intervening networks, including wide area networks following a system architecture unlike any local area network architecture.

Techniques have been developed to interconnect local area networks even where those networks are linked only by an intervening network. One known technique requires that the intervening network encapsulate the local area network data into a frame or packet structure which the intervening network can handle. This may require that the local area network data be segmented at the point of entry into the intervening network and then reassembled at the point of exit from the intervening network. The encapsulation approach has the drawback that end-to-end transmission efficiency is degraded since the frame or packet structure used in the intervening network will add a considerable number of non-data bits to the information flow. Routing techniques have also been use to transport the data between separated local area networks. The routing techniques also degrade the transmission efficiency between the two end stations on the communications path.

Clearly, it is desirable to allow local area networks to be interconnected using a frame structure at least substantially similar to the frame structure employed in the local area networks themselves. Ethernet networks consisting of multiple, interconnected Ethernet local area networks have been developed. Similarly, Token Ring networks consisting of multiple, interconnected Token Ring local area networks have been developed. It is possible for an end station in a given Ethernet local area network to communicate with another end station in a remote Ethernet local area network through such Ethernet networks using a frame structure substantially similar to the standard Ethernet frame structure. Similarly, it is possible for an end station on a given Token Ring local area network to communicate with an end station on a remote Token Ring local area network using a frame structure similar to that employed within a Token Ring local area network. Frames used in intervening networks which connect Ethernet-to-Ethernet or Token Ring-to-Token Ring local area networks may differ from frame structures used within the local area networks due to the need to include information required to address the remote local area network.

If users connected to a particular type of local area network (either Ethernet or Token Ring) only wish to communicate with users attached in the same type of local area network, the known approaches described above would probably satisfy their needs. There are, however, many Ethernet and many Token Ring local area networks also in use today. Clearly, situations will arise where an Ethernet user will wish to communicate with a Token Ring user and vice versa.

SUMMARY OF THE INVENTION

The present invention is a converged service which permits users of either an Ethernet or a Token Ring local area network to communicate with other local area network users regardless of whether those users are connected to the same or the opposite type of local area network.

The invention is implemented in converged service edge devices located at the boundaries between traditional local area networks and an intervening network. An edge device accepts an incoming data frame and determines whether it originates at a Token Ring station. If the frame does not originate at a Token Ring station, by definition it must originate at an Ethernet station. Any frame originating at an Ethernet station is modified by adding a virtual LAN tag field containing information which will allow the frame to reach its ultimate destination across an intervening network. The frame is also modified by adding a length field defining the length of the frame. An ordinary Ethernet frame has a maximum length of 1500 bytes. Token ring frames are modified by deleting selected fields and then adding the virtual LAN tag. Regardless of the type of the frame, the included frame check sequence character must be recalculated to reflect the noted changes in the frame contents.

BRIEF DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

FIG. 1 is a schematic representation of the type of (data-processing network in which the present invention is implemented;

FIG. 2 is a schematic representation of a standard Token Ring frame;

FIG. 3 is a schematic representation of a converged service frame which can be used to transport data originating in either a Token Ring or Ethernet network;

FIG. 4 is a schematic representation of a standard Ethernet frame;

DETAILED DESCRIPTION

Figure 5:
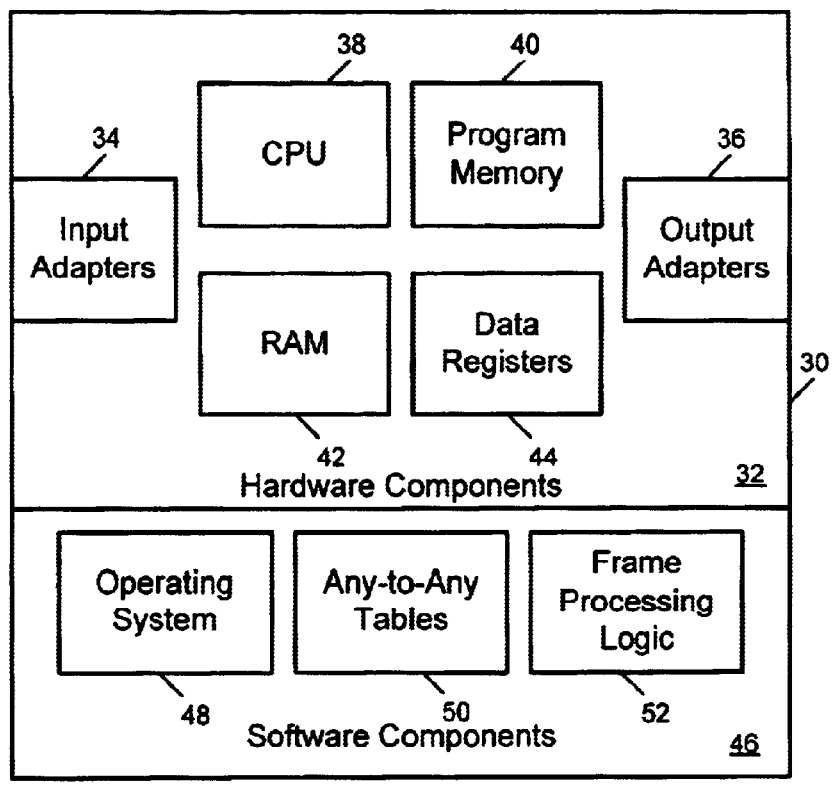
FIG. 5 is a block diagram of the major hardware and software components of a converged service edge device of the type generally shown in FIG. 1.

Referring to FIG. 1, the present invention allows local area networks such as Token Ring LANs 10 and 12 and Ethernet LAN 14, shown connected to a converged service edge device 16, to communicate efficiently with remote local area networks, such as Token Ring LAN 18 and Ethernet LANs 20 and 22, shown connected to a remote converged service edge device 24 through an intervening network 26. The intervening network 26 includes one or more devices capable of relaying data traffic. The network 26 may or may not be what is commonly considered to be a wide area network and in fact may be as simple as a point to point connection between two remote edge devices. The details of the network are not essential to an understanding of the present invention since the network is considered basically to be a data relay. From time to time, the network 26 may be referred to as a converged service network, a term which should be construed as limiting. Edge devices, which are described in detail later, perform the functions of converting data frames provided by Ethernet or Token Ring devices to a single converged format at the point of ingress into the network 26 and the inverse function of converting frames having converged format into a standard LAN format used in a destination LAN. The inverse functions performed at the point of egress from the network 26.

Since frames arriving at an edge device are processed on a first in—first out basis, it is implicit that the converged service traffic flowing through the network 26 at any given time may be a mixture of Ethernet source and Token Ring source traffic.

As noted earlier, the frames which traverse the converged service network 26 have a single converged format, whether those frames originate in an Ethernet or a Token Ring LAN. The differences between the structure of the converged format and the structures of standard Ethernet and Token Ring frames will be described with reference to FIGS. 2, 3 and 4. Referring first to FIG. 2, that Figure shows the structure of a standard Token Ring frame, the frame includes a starting delimiter field SD, an access control field AC, a frame control field FC, a destination address field DA, a source address field SA, a routing information field RIF, a user data field, a frame check sequence character field FCS, an ending delimiter ED, a frame status field FS and an interframe gap IFG used in discriminating between successive frames. The format and possible values for each of these fields is established in IEEE 802.5 specifications. Token Ring frames may range in size up to 18, 207 bytes but are typically in the 4,000 to 4,500 byte range. This is considerably larger than standard Ethernet frames which are limited to 1,500 bytes (or 1,504 bytes where the frame is used in an Ethernet network.

Standard Ethernet frames, as depicted in FIG. 4, have a relatively simpler structure, including a starting delimiter field SD, a destination address field DA, a source address field SA, a length field Le, the user data field, a frame check sequence character field FCS, and an interframe gap IFG.

The converged frame format, shown in FIG. 3, is a derivative of the standard Ethernet frame format and includes the same framing fields; namely, the starting delimiter field and the interframe gap. The converged frame format further includes standard destination address and source address fields, the user data field, and a frame check sequence field. The converged frame format further includes a type field which identifies the source of the frame as being either an Ethernet device or a Token Ring device, an extended routing information field which can be used to transport information typically carried in Token Ring frames, a type/length field and an 802.1Q field which contains the information required to transport the frame from a source station in one local area network to a destination station in another local area network across the intervening devices forming a virtual LAN. The field definitions for the 802.1Q tag are included in a readily available IEEE specification.

The major hardware and software components of an ingress point edge device are shown in FIG. 5. An edge device 30 has hardware components 32 including a central processor 38, program memory 40, random access memory 42 and a number of data registers 44 required for temporary storage of data during manipulation. The hardware components 32 further include input adapters 34 for receiving data frames from a plurality of Ethernet and/or Token Ring LANs. Output adapters 36 are used to provide frames having the converged format to one or more relay devices in one or more intervening networks.

Software components 46 in the edge device 30 include an operating system 48, any-to-any translation tables 50 and frame processing logic 52 used in converting Ethernet or Token Ring frames to the converged format or vice versa. Both the Any-to-Any translation tables and the frame processing logic are described in more detail below.

Where an edge device performs egress point functions, the input adapters are considered to be those adapters connected to any intervening networks while the output adapters are considered to be those adapters connected to possible destination LANs. As is conventional, both the ingress point and the egress point functions ,nay be performed in the same edge device at different times.

Figure 6:
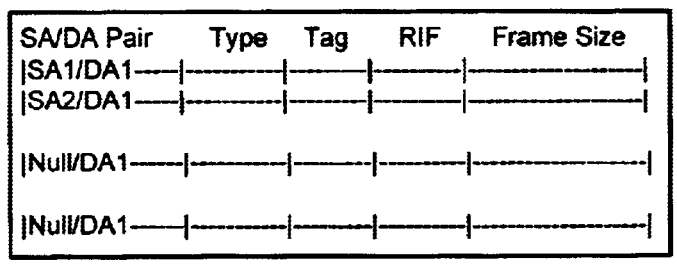
FIG. 6 is a schematic representation of one type of Any-to-Any Translation Table used in the routing of frames having Token Ring sources or destinations.

FIG. 6 shows one form of translation table. A translation table is used only where either the source or the destination is a Token Ring device. The table is indexed by source address and destination address pairs and serves to preserve Source Route Bridging information and maximum frame size wherever possible. Each table entry includes a Type field which indicates whether the source frame is an Ethernet or Token Ring bridging frame, a Tag field which indicates whether a destination includes 802.1Q or virtual LAN capability, an RIF field containing routing information and a Frame Size field which defines the maximum size of the frame for the particular source address/destination address pair.

A preferred embodiment of the invention uses a load balancing mechanism for translational bridging environments as disclosed in U.S. application Ser. No. 09/149,908 "Load Balancing Mechanism for a Translational Bridge Environment" filed Sept. 9, 1998 by J. P. Ervin et al, which application is assigned to the assignee of the present invention. The invention disclosed in the referenced application allows load balancing for both Token Ring only or mixed Token Ring/Ethernet networks. The invention allows multiple paths to be identified where they exist, even when communicating with an Ethernet end station.

In a source-routing environment, the translation table reflects all paths to each identified destination address. Unused paths are represented by a "null SA" while active paths are represented by an SA/DA entry. An unused path to a particular destination address may be assigned to another source address to balance the traffic load. The first two entries in the table shown in FIG. 6 represent active paths between two different sources and the same destination. The next two entries represent unused paths which are available to the same destination address.

Figure 7:
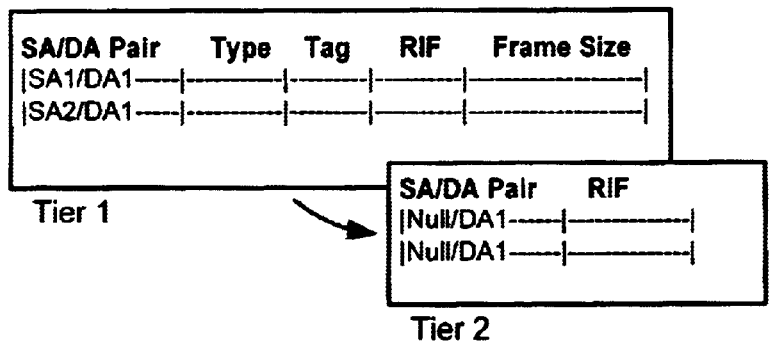
FIG. 7 is a schematic representation of an alternate type of Any-to-Any Translation Table.

An alternate translation table structure is shown in FIG. 7. The alternate table structure is a two tier structure. The first tier includes entries for assigned SA/DA pairs; that is, for currently active paths between sources and a given destination. The second tier of the structure contains only unused paths to the same destination address and assumes any listed unused paths are available for assignment for load balancing. A load balancing action is appropriate where a different source wants to attach to the destination identified in the second tier table or where a previously active path has failed and must be replaced by a currently idle path.

Frames originating in Ethernet LANs or Token Ring LANs will arrive at the point of ingress into the network in their native LAN format and must be mapped into the converged service format before entering the network. For Ethenet frames, this mapping operation requires insertion of the 802.1Q header into the Ethernet frame and recalculation of the Frame Check Sequence character at the ingress point. In effect, the converged frame is an IEEE 802.3z (Gigabit Ethernet) frame with IEEE 802.1Q VLAN tagging.

For Token Ring frames, mapping to the converged service format requires using the IEEE 802.1Q tags (including source routing support), modifications of the IEEE 802.5 Token Ring frame, mapping of Token Ring priority bits into the IEEE 802.1Q field, and recalculation of the Frame Check Sequence character.

Figure 8:
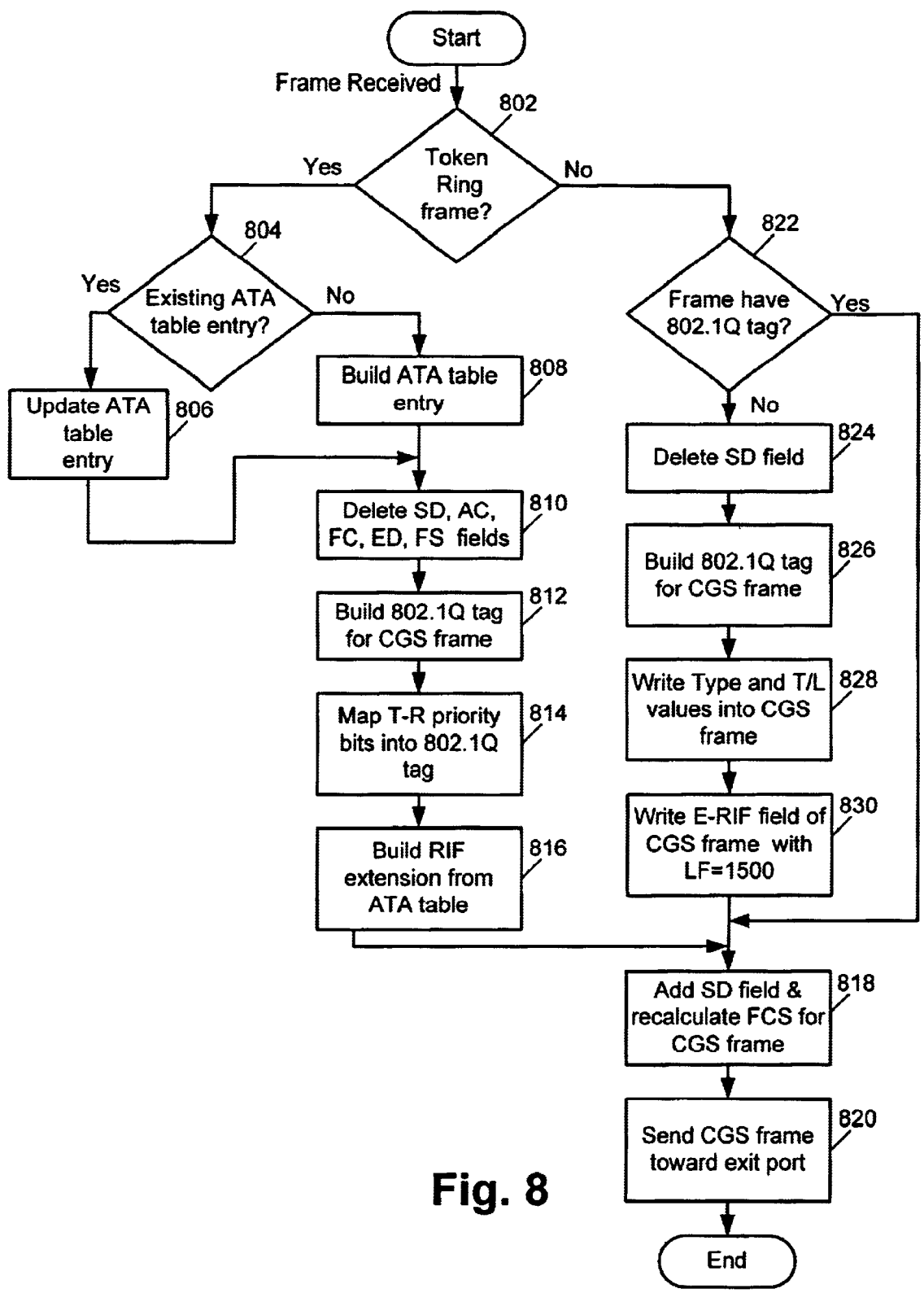
FIG. 8 is a flow chart of steps that are performed at a converged service edge device on receiving a frame from a source not having converged service capability, the edge device being a point of ingress to an intervening network.

FIG. 8 is a flow chart of the steps that are performed in mapping either an Ethernet frame or a Token Ring frame into the converged service format at a point of ingress into a network.

The first test 802 conducted on a frame received at an edge device determines whether the frame is a Token Ring frame. If the received frame is a Token Ring frame, a check 804 is made as to whether there is already an ATA table entry for the source address/destination address pair identified in the frame. If an existing ATA table entry is found, that entry is updated in an operation 806. If no existing ATA table entry is found, one is built in an operation 808. The steps required to build a table entry include setting the SA/DA field using the frame's fields. If a routing information field is present in the frame, the field is saved in the table entry and the maximum frame length is recorded.

When the ATA table building/maintenance operations are complete, certain Token Ring unique fields are stripped from the frame being processed in operation 810. The stripped fields include starting delimiter SD, access control AC, frame control FC, ending delimiter ED and frame status FS. An 802.1Q tag is created in operation 812 in accordance with the IEEE 802.1Q specification and priority bits in the frame are mapped into the 802.1Q tag in a following operation 814. Finally, an extension E-RIF to the RIF field is built from the ATA table entry in an operation 816. A starting delimiter of the type used by the converged service network is added to the frame generated thus far in an operation 818, following by recalculation of the frame check sequence value. Finally, the frame (now a converged service frame) is forwarded to the intervening or converged service network in a final operation 820.

If the initial test 802 had not identified the frame as a Token Ring frame, it is assumed the frame must be Ethernet in origin and the program branches to a test 802 which determines whether the frame already has an 802.1Q tag. If the frame already has an 802.1Q tag, a number of operations are bypassed with the programming branching to the previously-discussed operation 818.

If the frame lacks an 802.1Q tag in step 822, the starting delimited field is stripped in operation 824 as a preliminary to building the 802.1Q tag in step 826. When the tag is constructed, frame type and type/length values are written into the frame in an operation 828. Finally, an extended routing information field E-RIF is written into the frame with the maximum frame length being set to 1500 bytes to reflect the fact that an Ethernet origin frame is being processed in step 830.

When a converged service frame intended for an Ethernet destination reaches the point of egress from the converged service network, the frame, must be mapped back into a conventional IEEE 802.3 frame, assuming that the destination Ethernet network does not support IEEE 802.1Q.tagging. Similarly, when a converged service Francine intended for a Token Ring destination reaches the egress point, the frame must be mapped back into a conventional IEEE 802.5 frame. The exception in each of the indicated situations is where the destination itself is capable of supporting converged service frames. If the destination supports converged service frames, the described mapping operations are unnecessary.

Figure 9:
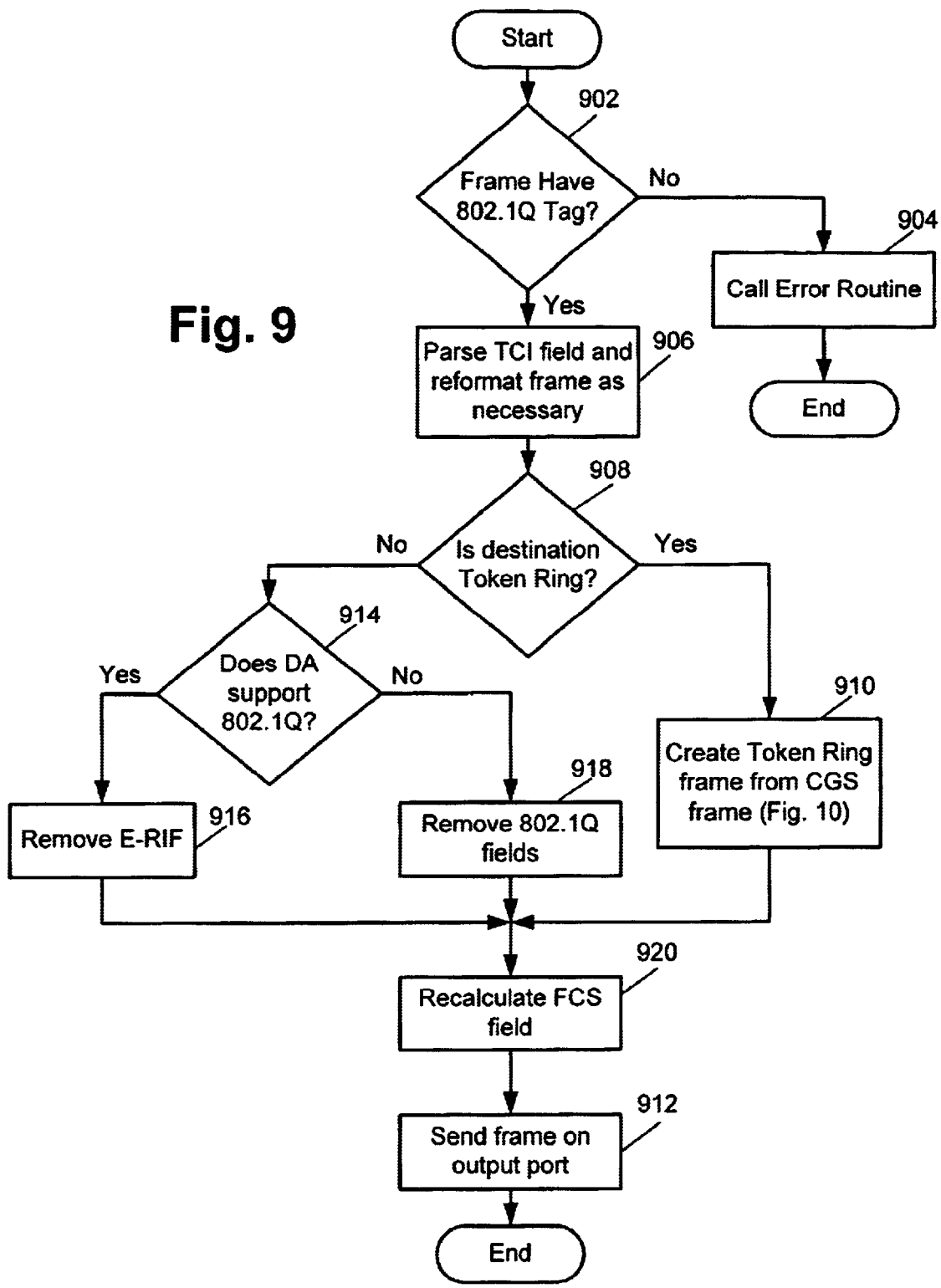
FIG. 9 is a flow chart of steps that are performed at a converged service edge device which receives a frame from an converged service network and prepares that frame for delivery to either an Ethernet destination or a Token Ring destination.

FIG. 9 is a flow chart of the steps required to map a converged service frame to either Ethernet or a Token Ring format. In a preliminary operation, a check 902 is made to determine whether the frame received from the network includes an 802.1Q tag. The absence of an 802.1Q tag in the frame is an error condition since every converged service frame is supposed include such tag. An error routine is called in an operation 904 and the frame processing steps ends abnormally.

Assuming the frame has an 802.1Q tag, the TCI or Tag Control Information field in the frame is parsed in operation 906 and the frame is reformatted as necessary. The contents of the TCI field are defined by the 802.1Q specification and include user priority information, a canonical format indicator and a VLAN identifier. A test 908 determines whether the destination address for the frame is a Token Ring device. If frame is intended for a Token Ring destination, a series of operations are performed to generate a Token Ring frame. These operations, represented generally in this figure by block 910, will be described in detail with reference to FIG. 10.

If test 908 shows that the frame is intended for an Ethernet destination, a following test 914 determines whether the Ethernet destination supports 802.1Q operation. If the destination does support 802.1Q operation, the extended RIF field is removed from the frame in an operation 916. Conversely, if the destination address does not support 802.1Q operation, then 802.1Q fields are removed from the frame in an operation 918. The Frame Check Sequence character is recalculated in an operation 920 regardless of whether the frame is processed in operation 916 or operation 918. The end result of operation 920 is an Ethernet frame which can be forwarded to the appropriate output port in an operation 912. The same forwarding operation applies to any Token Ring frame resulting from operation 910.

Figure 10:
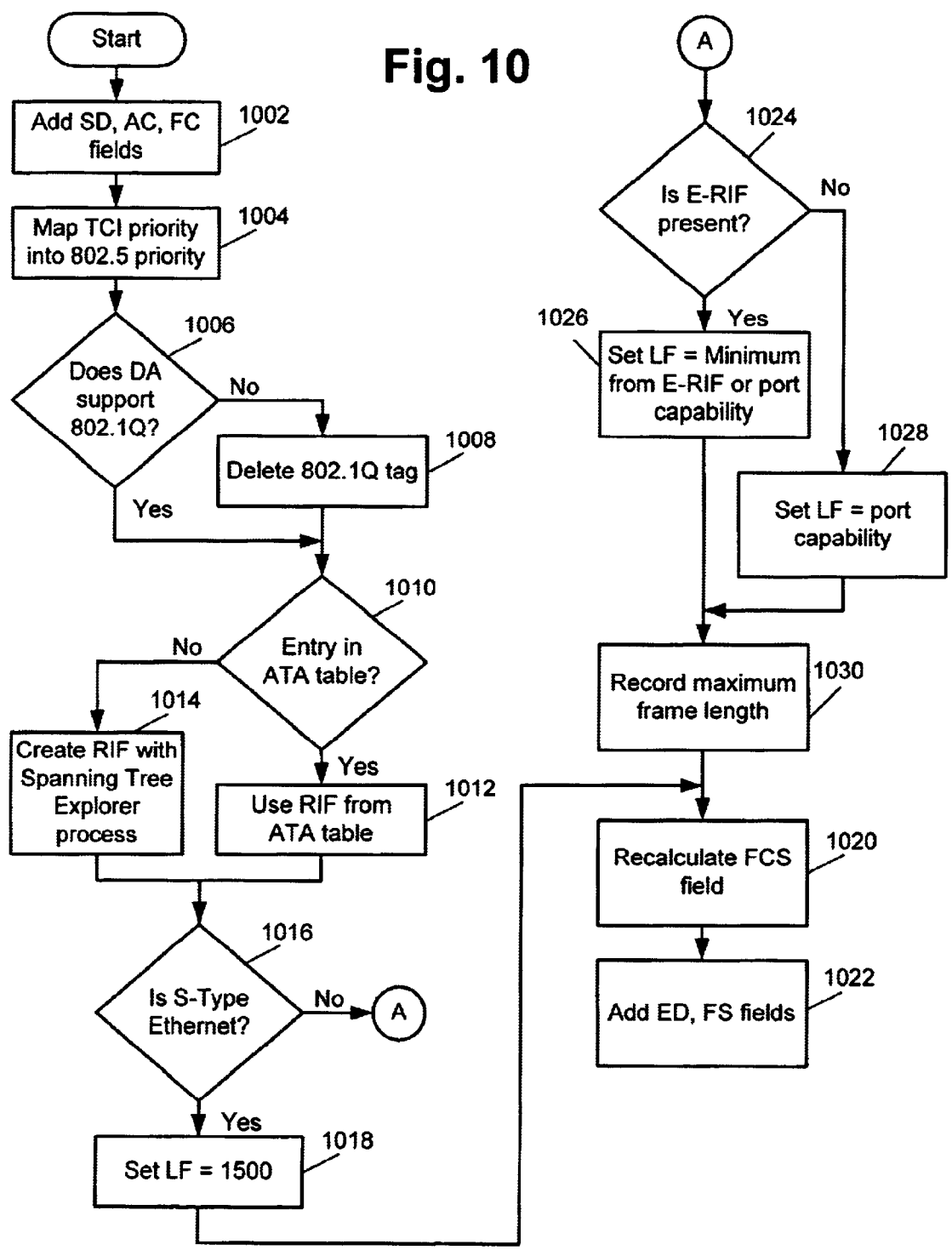
FIG. 10 is a flow chart of additional steps that are performed in regenerating a Token Ring frame at a point of egress from an intervening network.

FIG. 10 is a flow chart of the operations that are required to generate a Token Ring frame at the point of egress from the converged service network. In an initial operation 1002, a Token Ring starting delimiter (SD) field replaces the Ethernet starting delimiter field used in the converged service frame. Standard Token Ring access control (AC) and frame control (FC) fields are restored to the frame structure in the same operation. Priority information retrieved from the converged service frame is mapped into the 802.5 frame structure in an operation 1004. A test 1006 is then conducted to determine whether the destination address for the frame being processed supports 802.1Q operation. If the destination address does not support such operation, the 802.1Q tag is deleted in an operation 1008. Otherwise, this operation is bypassed and a test 1010 is conducted to determine whether an appropriate entry exists in the translation table for the source address/destination address pair identified in the frame.

If an appropriate table entry is not found, a routing information field is created in an operation 1014 with the Spanning Tree Explorer bit in the field being set. If, however, an appropriate entry does exist in the translation table, the routing information field information from the entry is restored to the frame in an operation 1012. A test 1016 determines whether the frame source was an Ethernet LAN. If the test 1016 shows that the frame originated in an Ethernet LAN, the maximum length of the frame is set to 1500 bytes in an operation 1018. Following operation 1018 the frame check sequence character is recalculated in operation 1020. Finally, standard Token Ring ending delimiter (ED) and frame status (FS) fields are restored to the frame in an operation 1022.

If operation 1016 had indicated that the frame did not originate in an Ethernet LAN, meaning it must have originated in a Token Ring LAN, the program branches to a test 1024 for the presence of an extended RIF field. If such a field is found, the frame length is set (in operation 1026) to the lower of the values contained in the extended RIF field or a port capability field contained in the edge device. If there is no extended RIF field, the frame length is set to a value retrieved from port capability information contained at the edge device in step 1028. In either event, the maximum frame length is recorded in an operation 1030. This operation is followed by the previously referenced operations 1020 of recalculating the frame check sequence field and 1022 of restoring the Token Ring ending delimiter and frame status fields to the frame being processed.

While there has been described what is considered to be a preferred embodiment of the invention, variations and modifications in the preferred embodiment will occur to those skilled in the relevant art once they learn of the invention. Therefore, it is intended that the appended claims shall be construed to include both the preferred embodiment and all such variations and modifications as fall within the true spirit and scope of the invention.

What is claimed is:

1. A method of processing an incoming data frame to generate an output data frame having a format suitable for the transport of data originating as either a token ring frame or an Ethernet frame, said method comprising the steps of:
   determining whether the incoming data frame is a token ring frame;
   if the incoming data frame is not a token ring frame, generating the output data frame by modifying the incoming data frame by adding at leas, a frame type field and a virtual LAN tag;
   if the incoming frame is determined to be a token ring frame, generating the output data frame by modifying the incoming data frame by deleting selected fields therefrom and by adding at least a frame type field and an virtual LAN tag.

2. A method as set forth in any of claims 1 including the additional step of recalculating a frame check sequence character for the modified frame once the modifications have been completed.

3. A method as set forth in claim 1 wherein the selected fields deleted from a token ring frame include starting and ending delimiter fields, an access control field, a frame control field and a frame sequence field.

4. A method as set forth in claim 3 wherein the step of modifying an incoming token ring frame further includes the steps of:
   determining the value of any priority bits contained in the incoming frame; and
   mapping the determined value into the virtual LAN tag added to the frame.

* * * * *